United States Patent
Cui et al.

(10) Patent No.: US 11,936,647 B2
(45) Date of Patent: Mar. 19, 2024

(54) IDENTITY VERIFICATION METHOD AND APPARATUS, STORAGE MEDIUM, AND COMPUTER DEVICE

(71) Applicant: Tencent Technology (Shenzhen) Company Limited, Shenzhen (CN)

(72) Inventors: Qi Cui, Shenzhen (CN); Zhijun Geng, Shenzhen (CN); Runzeng Guo, Shenzhen (CN); Shaoming Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 352 days.

(21) Appl. No.: 17/368,607

(22) Filed: Jul. 6, 2021

(65) Prior Publication Data

US 2021/0344675 A1 Nov. 4, 2021

Related U.S. Application Data

(63) Continuation of application No. PCT/CN2020/079144, filed on Mar. 13, 2020.

(30) Foreign Application Priority Data

Apr. 8, 2019 (CN) .......................... 201910277029.7

(51) Int. Cl.
*H04L 29/06* (2006.01)
*G06K 9/00* (2022.01)
(Continued)

(52) U.S. Cl.
CPC ........... *H04L 63/0861* (2013.01); *G06N 3/08* (2013.01); *G06V 40/171* (2022.01);
(Continued)

(58) Field of Classification Search
CPC ..... H04L 63/0861; H04L 63/045; G06N 3/08; G06F 2218/04
See application file for complete search history.

(56) References Cited

U.S. PATENT DOCUMENTS

| 2002/0056043 A1* | 5/2002 | Glass ...................... G06F 21/32 |
| | | 713/179 |
| 2003/0140235 A1 | 7/2003 | Immega et al. |

(Continued)

FOREIGN PATENT DOCUMENTS

| CN | 103236931 A | 8/2013 |
| CN | 104598793 A | 5/2015 |

(Continued)

OTHER PUBLICATIONS

Tencent Technology, ISR, PCT/CN2020/079144, Jun. 17, 2020, 3 pgs.

(Continued)

*Primary Examiner* — Darshan I Dhruv
(74) *Attorney, Agent, or Firm* — Morgan, Lewis & Bockius LLP

(57) ABSTRACT

This application relates to an identity verification method performed at a computer device and a computer-readable storage medium. The method includes: obtaining a biometric feature image from a video acquisition device via an encrypted connection; extracting biometric feature information from the biometric feature image in a local safe area within a running environment of the computer device; encrypting the biometric feature information in the local safe area, to obtain encrypted feature information, and transmitting the encrypted feature information to an application run in a local normal area within the running environment of the computer device; transmitting the encrypted feature information to a verification server through the application via a network connection; and receiving, through the application
(Continued)

and via the network connection, an identity verification result returned by the verification server, the identity verification result being obtained after the encrypted feature information is decrypted and verified by the verification server.

20 Claims, 8 Drawing Sheets

(51) Int. Cl.
*G06N 3/08* (2023.01)
*G06V 40/16* (2022.01)
*G06V 40/40* (2022.01)
*H04L 9/40* (2022.01)

(52) U.S. Cl.
CPC ............ *G06V 40/172* (2022.01); *G06V 40/45* (2022.01); *H04L 63/045* (2013.01); *G06F 2218/04* (2023.01)

(56) References Cited

U.S. PATENT DOCUMENTS

| | | | | |
|---|---|---|---|---|
| 2011/0314530 | A1* | 12/2011 | Donaldson | H04L 9/3231 726/7 |
| 2012/0148115 | A1* | 6/2012 | Birdwell | G07C 9/37 382/116 |
| 2017/0213211 | A1* | 7/2017 | Sibert | G06Q 20/405 |
| 2017/0308740 | A1* | 10/2017 | Dunlap | G06V 40/172 |
| 2018/0330179 | A1* | 11/2018 | Streit | G06F 18/2414 |
| 2019/0065819 | A1 | 2/2019 | Aoki | |
| 2019/0213311 | A1* | 7/2019 | Tussy | G06V 10/17 |
| 2019/0279047 | A1* | 9/2019 | Streit | G06F 18/253 |
| 2019/0392659 | A1* | 12/2019 | Seenivasagam | G06V 40/168 |
| 2020/0034807 | A1* | 1/2020 | Shamai | H04L 63/0861 |
| 2020/0059703 | A1* | 2/2020 | Sonare | H04N 21/23418 |
| 2020/0250403 | A1* | 8/2020 | Xiao | G06V 40/168 |
| 2020/0250679 | A1* | 8/2020 | Arora | G07C 9/25 |
| 2020/0280550 | A1* | 9/2020 | Lindemann | H04L 63/0428 |
| 2020/0314094 | A1* | 10/2020 | Shin | G06V 40/10 |
| 2021/0256102 | A1* | 8/2021 | Luft | H04L 63/045 |

FOREIGN PATENT DOCUMENTS

| | | | | |
|---|---|---|---|---|
| CN | 104751154 | A | | 7/2015 |
| CN | 104751154 | A | * | 7/2015 |
| CN | 105227316 | A | | 1/2016 |
| CN | 105681324 | A | | 6/2016 |
| CN | 107679861 | A | | 2/2018 |
| CN | 107818313 | A | * | 3/2018 ......... G06K 9/00268 |
| CN | 107818313 | A | | 3/2018 |
| CN | 108011720 | A | | 5/2018 |
| CN | 108549873 | A | | 9/2018 |
| CN | 108549873 | A | * | 9/2018 ......... G06K 9/00228 |
| CN | 109102266 | A | * | 12/2018 ............. G06Q 20/10 |
| CN | 109102266 | A | | 12/2018 |
| CN | 109495269 | A | * | 3/2019 ......... H04L 63/0428 |
| CN | 109495269 | A | | 3/2019 |
| CN | 110414200 | A | | 11/2019 |
| JP | 2004145395 | A | | 5/2004 |
| JP | 2011035739 | A | | 2/2011 |
| JP | 2015512581 | A | | 4/2015 |
| JP | 2018523185 | A | | 8/2018 |
| WO | WO 2019047897 | A1 | | 3/2019 |

OTHER PUBLICATIONS

Tencent Technology, WO, PCT/CN2020/079144, Jun. 17, 2020, 5 pgs.
Tencent Technology, IPRP, PCT/CN2020/079144, Sep. 28, 2021, 6 pgs.

* cited by examiner

IDENTITY VERIFICATION METHOD AND APPARATUS, STORAGE MEDIUM, AND COMPUTER DEVICE

CROSS-REFERENCE TO RELATED APPLICATIONS

This application is a continuation application of PCT Patent Application No. PCT/CN2020/079144, entitled "IDENTITY VERIFICATION METHOD AND APPARATUS, STORAGE MEDIUM, AND COMPUTER DEVICE" filed on Mar. 13, 2020, which claims priority to Chinese Patent Application No. 201910277029.7, entitled "IDENTITY VERIFICATION METHOD AND APPARATUS, STORAGE MEDIUM, AND COMPUTER DEVICE" and filed on Apr. 8, 2019, both of which are incorporated herein by reference in their entirety.

FIELD OF THE TECHNOLOGY

This application relates to the field of biometric feature recognition technologies, and in particular, to an identity verification method and apparatus, a computer-readable storage medium, and a computer device.

BACKGROUND OF THE DISCLOSURE

With the development of computer technologies, biometric feature recognition technologies emerge. The biometric feature recognition technologies are technologies that use physiological features (for example, a fingerprint, an iris, a face, and DNA) inherent to a human body or behavior features (for example, a gait, and a keystroke habits) to perform user identity verification. In a conventional offline identity verification manner, for example, through face recognition to perform identity verification offline, generally, face calculation is performed in the normal environment of an acceptance terminal, to obtain an intermediate calculation result, the intermediate calculation result is then uploaded to a server, and the server finally performs identity verification.

However, in a conventional offline identity verification method, an intermediate calculation result is easily attacked maliciously by a middleman in the calculation and transmission process, and the risk of data leakage exists, resulting in a safety hazard existing in identity verification.

SUMMARY

In view of this, for a technical problem that a conventional identity verification manner has a safety hazard, it is necessary to provide an identity verification method and apparatus, a computer-readable storage medium, and a computer device.

An identity verification method is provided, applicable to a computer device, the method including:
obtaining a biometric feature image from a video acquisition device via an encrypted connection;
extracting biometric feature information from the biometric feature image in a local safe area within a running environment of the computer device;
encrypting the biometric feature information in the local safe area, to obtain encrypted feature information, and transmitting the encrypted feature information to an application run in a local normal area within the running environment of the computer device;
transmitting the encrypted feature information to a verification server through the application via a network connection; and
receiving, through the application and via the network connection, an identity verification result returned by the verification server, the identity verification result being obtained after the encrypted feature information is decrypted and verified by the verification server.

An identity verification apparatus is provided, including:
an obtaining module, configured to obtain a biometric feature image from a video acquisition device via an encrypted connection;
an extraction module, configured to extract biometric feature information from the biometric feature image in a local safe area within a running environment of the computer device;
an encryption and transmission module, configured to: encrypt the biometric feature information in the local safe area, to obtain encrypted feature information, and transmit the encrypted feature information to an application run in a local normal area within the running environment of the computer device;
a transmission module, configured to transmit the encrypted feature information to a verification server through the application via a network connection; and
a receiving module, configured to receive, through the application and via the network connection, an identity verification result returned by the verification server, the identity verification result being obtained after the encrypted feature information is decrypted and verified by the verification server.

A non-transitory computer-readable storage medium stores a plurality of computer programs that, when executed by a processor of a computer device, cause the computer device to perform the aforementioned identity verification method.

A computer device includes a memory and a processor, the memory storing a plurality of computer programs that, when executed by the processor, cause the computer device to perform the aforementioned identity verification method.

In the foregoing identity verification method and apparatus, the computer-readable storage medium, and the computer device, the biometric feature information is extracted from the biometric feature image in the local safe area, and the biometric feature information is then encrypted, to obtain the encrypted feature information. The encrypted feature information is transmitted to the verification server through the application run in the local normal area for identity verification, to obtain the identity verification result. In this way, the biometric feature information is extracted from the biometric feature image in a local safe area, to effectively avoid the risk of attacks by malicious middleman during operation. When the biometric feature information is transmitted to the verification server to perform identity verification, once the biometric feature information is to be transmitted to the normal area, encryption is performed, so that the risk that the biometric feature information is tampered with can be effectively avoided, thereby greatly improving the security of identity verification.

DESCRIPTION OF EMBODIMENTS

Figure 1:
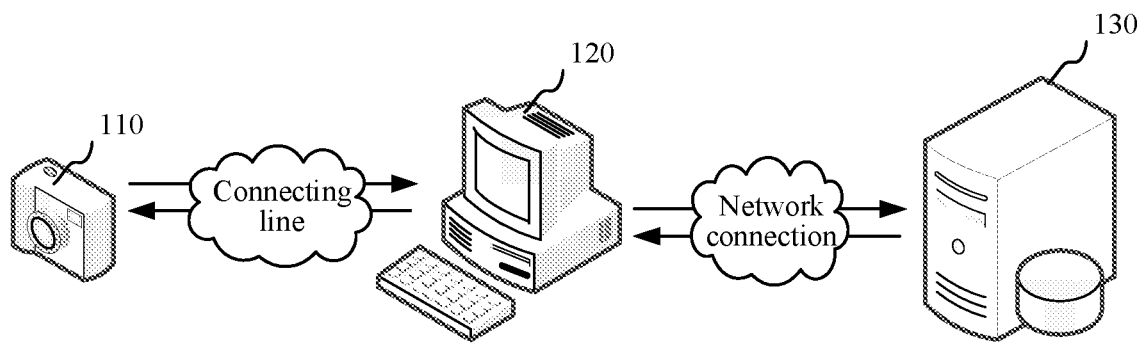
FIG. 1 is a diagram of an application environment of an identity verification method in an embodiment.

To make the objectives, technical solutions, and advantages of this application clearer, the following further describes this application in detail with reference to the accompanying drawings and the embodiments. The specific embodiments described herein are merely used to explain this application but are not intended to limit this application.

Artificial Intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, and relates to a wide range of fields including a hardware-level technology and a software-level technology. AI foundational technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

The CV is a science that studies how to use a machine to "see", and furthermore, is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific subject, the CV studies related theories and technologies, and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Machine learning (ML) is a multi-field interdiscipline, and relates to a plurality of disciplines such as a probability theory, statistics, an approximation theory, a convex analysis, and an algorithm complexity theory. The ML specializes in studying how a computer simulates or implements a human learning behavior to obtain new knowledge or skills, and reorganize an existing knowledge structure, so as to keep improving its performance. The ML is a core of the AI, is a basic way to make the computer intelligent, and is applied to various fields of the AI. The ML and deep learning generally include technologies such as an artificial neural network, a belief network, reinforcement learning, transfer learning, inductive learning, and learning from demonstrations.

With the research and progress of the AI technology, the AI technology is studied and applied in a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied in more fields, and play an increasingly important role.

The solutions provided in the embodiments of this application relate to technologies such as CV of AI, and are specifically described by using the following embodiments:

FIG. 1 is a diagram of an application environment of an identity verification method in an embodiment. Referring to FIG. 1, the identity verification method is applied to an identity verification system. The identity verification system includes a video acquisition device 110, an acceptance terminal 120, and a verification server 130. The video acquisition device 110 and the acceptance terminal 120 are connected through a connecting line or a network. The connecting line may be a data line with a data transmission function. The acceptance terminal 120 and the verification server 130 are connected through the network. The acceptance terminal 120 may obtain a biometric feature image from a video or an image acquired by the video acquisition device 110, thereby implementing the identity verification method together with the verification server 120. The acceptance terminal 120 may be specifically a desktop terminal or a mobile terminal. The mobile terminal may be specifically at least one of a mobile phone, a tablet computer, a notebook computer, and the like. The verification server 130 may be implemented by using an independent server or a server cluster that includes a plurality of servers.

The acceptance terminal 120 may be specifically a service processing device. When the identity verification method is applicable to an access control system, the acceptance terminal 120 may be specifically an access control device. When the identity verification method is applicable to a payment system, the acceptance terminal 120 may be specifically an offline payment device. It may be understood that, when the identity verification method is applicable to different service systems that need to perform identity verification, the acceptance terminal may be specifically a corresponding service processing device.

Figure 2:
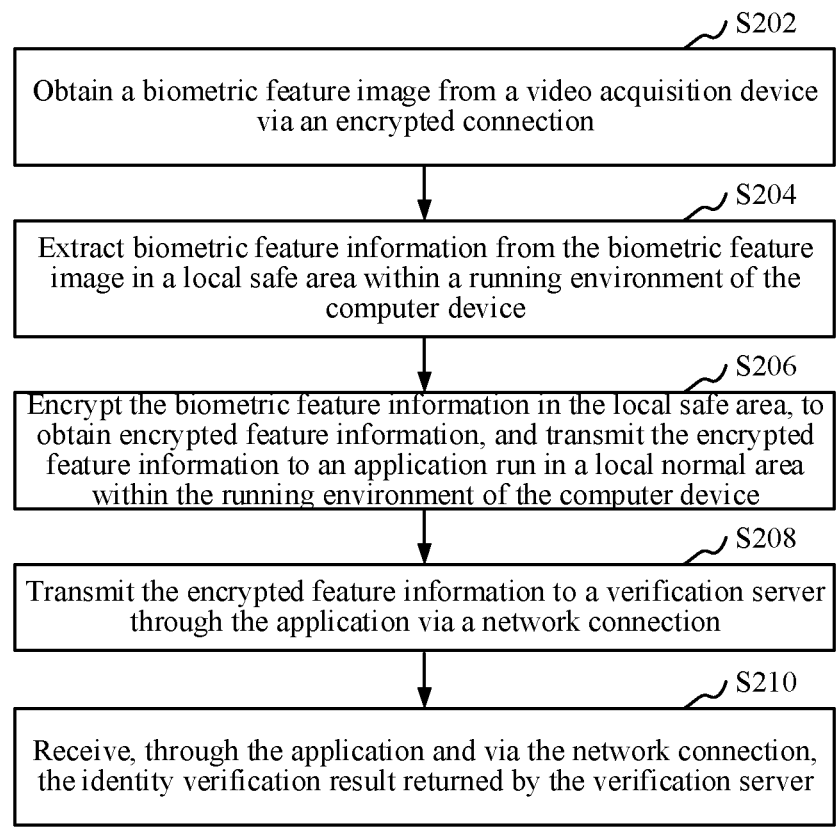
FIG. 2 is a schematic flowchart of an identity verification method in an embodiment.

As shown in FIG. 2, in an embodiment, an identity verification method is provided. This embodiment is mainly described by using an example in which the method is applicable to a computer device (the foregoing acceptance terminal 120 as shown in FIG. 1). Referring to FIG. 2, the identity verification method specifically includes the following steps:

S202. Obtain a biometric feature image from a video acquisition device via an encrypted connection.

The biometric feature image is an image including biometric features, and is used for identity verification. The biometric features are physiological features (for example, a fingerprint, an iris, a face, and DNA) inherent to a human body or behavior features (for example, a gait, and a keystroke habits). In this application, the biometric feature image may be specifically an image generated according to physiological features of a user, or may be an image generated according to behavior features of a user. The image generated according to the physiological features of the user is, for example, a face image generated by scanning a face of a user, a fingerprint image generated according to an acquired fingerprint of a user, or an iris image generated according to an acquired iris of a user. The image generated according to the behavior features of the user is, for example, an image generated according to a signature of a user, or a voiceprint map generated according to a voice of a user.

Specifically, the acceptance terminal may acquire an image frame in a real scenario in a current view of a camera by using a built-in camera or an external camera associated with the acceptance terminal, and obtain an acquired image frame. The acceptance terminal may detect the acquired image frame. When there is a biometric feature in the image frame, the acquired image frame is used as the biometric feature image. For example, a face image is used as an example. The acceptance terminal may detect whether there is a face image in the image frame. If there is a face image, the image frame is obtained as the face image.

The acquiring an image frame in a real scenario may be acquiring an image frame of a living body in a real scenario, or may be acquiring an image frame of an existing image including a biometric feature in a real scenario. The existing image including the biometric feature is, for example, an existing image including a face, an existing image including a fingerprint, or an existing image including a user signature. The existing image including the face is used as an example for description. For example, the existing image is an identity certificate or a facial picture.

In an embodiment, the acceptance terminal may be connected to the video acquisition device through a connecting line or a network. The video acquisition device includes a camera. The camera may be a monocular camera, a binocular camera, a Red-Green-Blue-Deep (RGB-D) camera, a three-dimensional (3D) camera (for example, a 3D structured light camera) or the like. The acceptance terminal may invoke the video acquisition device to start a camera scanning mode, scan a target object in a view of the camera in real time, and generate an image frame in real time according to a specific frame rate. The generated image frame may be buffered in the video acquisition device. The video acquisition device transmits the buffered image frame to the acceptance terminal.

In an embodiment, the video acquisition device and acceptance terminal may be connected through a connection line, for example, a universal serial bus (USB) interface. The video acquisition device scans a target object, generates video data, and transmits the video data to the acceptance terminal. To ensure the security of the video data, the video acquisition device may encrypt the video data, and then transmit the encrypted video data to the acceptance terminal.

In an embodiment, step S202, that is, the step of obtaining a biometric feature image may specifically include: receiving encrypted video data obtained by encrypting video data acquired by a video acquisition device and a first signature corresponding to the video acquisition device, the first signature being obtained by encrypting the encrypted video data by using a first private key by the video acquisition device; verifying the first signature by using a first public key corresponding to the first private key; decrypting the encrypted video data in the local safe area after the first signature is verified successfully, to obtain video data; and determining the biometric feature image according to the video data obtained through decryption in the local safe area.

In an embodiment, the video acquisition device may be mounted with a security processing chip. After the video acquisition device scans a target object and acquires the video data, the video data may be encrypted by using a preset symmetric key, to obtain encrypted video data.

Further, the video acquisition device encrypts the encrypted video data by using the first private key, to obtain a first signature. The first private key corresponds to the video acquisition device. Then, the encrypted video data and the first signature are transmitted to the acceptance terminal. In this way, the acceptance terminal may verify the first signature by using the first public key corresponding to the first private key, to verify an identity of the video acquisition device. The acceptance terminal may perform decryption in the local safe area by using the symmetric key after the first signature is verified successfully, to obtain video data. After the acceptance terminal obtains the video data through decryption, an image frame including a biometric feature may be extracted from the video data as the biometric feature image.

In an embodiment, the acceptance terminal may detect the image frames included in the video data. When there is a biometric feature in the image frame, the acquired image frame is used as the biometric feature image. For example, a face image is used as an example. The acceptance terminal may detect whether there is a face image in the image frame. If there is a face image, the image frame is obtained as the face image. In an embodiment, when the camera of the video acquisition device is a 3D camera, an image frame acquired by the video acquisition device includes a depth map and a color map that are in one-to-one correspondence. The acceptance terminal may use both the depth map and the color map that have the biometric features and are corresponding to each other as the biometric feature image.

Figure 3:
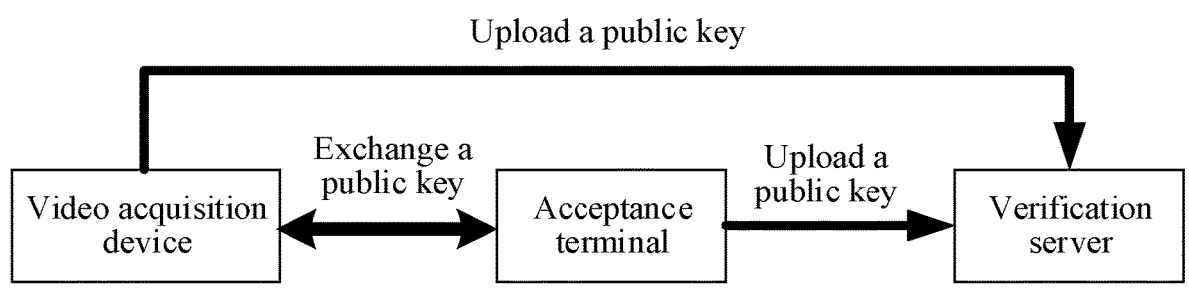
FIG. 3 is a schematic diagram of a key exchange manner in an embodiment.

FIG. 3 is a schematic diagram of a key exchange manner in an embodiment. In an embodiment, to ensure the confidentiality of the video data during transmission, the video acquisition device and the acceptance terminal may exchange asymmetric public keys with each other in a production environment, to complete two-way authentication between the video acquisition device and the acceptance terminal. The production environment refers to a stage before the device is sold and put into use. In an embodiment, the video acquisition device and the acceptance terminal may alternatively upload respective public keys to the verification server, for the verification server to verify the identity. In this way, when the video acquisition device and the acceptance terminal perform data transmission separately, signatures may be made by using respective private keys, so that a data receiver can ensure the reliability of a data source by verifying the signatures.

Correspondingly, the verification server may issue a symmetric key to the acceptance terminal, and the acceptance terminal transmits the symmetric key to the video acquisition device. In this way, the video acquisition device may encrypt the video data by using the symmetric key, and the acceptance terminal may perform decryption in the local safe area by using the symmetric key, to obtain the video data, thereby ensuring the security of the video data during transmission. When the acceptance terminal needs to transmit the extracted biometric feature information to the verification server, the acceptance terminal may encrypt the biometric feature information by using the issued symmetric key, to obtain encrypted feature information, and transmit the encrypted feature information to the verification server, thereby ensuring the security of the biometric feature information during transmission.

It may be understood that, the symmetric key may be issued by the server, or may be transmitted to another device by the acceptance terminal or the video acquisition device after being generated, provided that the devices may perform secure data communication. This is not limited in this embodiment of this application. It may be further understood that, the video acquisition device and the acceptance terminal may share a first symmetric key. The video acquisition device performs encryption by using the first symmetric key, and the acceptance terminal performs decryption by using the first symmetric key. The acceptance terminal and the verification server share a second symmetric key. The acceptance terminal performs encryption by using the second symmetric key, and the verification server performs decryption by using the second symmetric key. The first symmetric key and the second symmetric key may be specifically the same symmetric key, or may be different symmetric keys.

In the foregoing embodiments, the video acquisition device encrypts the acquired video data and transmits the encrypted video data to the acceptance terminal, and the acceptance terminal decrypts the encrypted video data in a safe area to obtain the biometric feature image. In this way, an encryption safe transmission manner is used between the video acquisition device and the acceptance terminal, thereby ensuring that the biometric feature image is prevented from being attacked and leaked by a middleman, and the acceptance terminal decrypts the encrypted video data in a safe area, thereby greatly improving the security of the identity verification.

S204. Extract biometric feature information from the biometric feature image in a local safe area within a running environment of the computer device.

The local safe area is a local trusted execution environment (TEE for short) of the acceptance terminal, and operations performed in the safe area are security operations. The TEE is also referred to as a safe and trusted area. The TEE is isolated from a rich execution environment (REE, also referred to as a normal area). An external computer device may communicate with the TEE only through a specific portal. Therefore, it is a safe and reliable operation to extract the biometric feature information from the biometric feature image in the local safe area of the acceptance terminal, thereby ensuring the security of the process and result of biometric feature processing.

The biometric feature information is information that reflects a biometric feature, and may be used for identity verification. The biometric feature information may be specifically one or a combination of color information, texture information, and shape information related to the biometric feature extracted from the biometric feature image. The biometric feature information is, for example, coordinate information of a biometric feature point, pixel color value distribution and pixel luminance value distribution reflecting the biometric feature, and a pixel depth of the biometric feature image.

A face image is used as an example for description. When the biometric feature image includes the face image, the biometric feature information extracted from the face image by the acceptance terminal may specifically include face position information. The face position information is information about distances or positioning coordinates between facial organs such as an outline, a hair style, ears, eyes, a nose, and a mouth of a face. The face position information is, for example, a distance between the eyes, an angle between the nose and the eyes, or a distance between the mouth and the nose. A fingerprint image is then used as an example for description. The acceptance terminal may extract information of texture lines and patterns in the fingerprint image in the local safe area. The patterns are formed by regularly arranging the texture lines. The biometric feature information of the fingerprint image is, for example, a starting point, an ending point, a joint point, and a bifurcation point.

Specifically, after obtaining the biometric feature image, the acceptance terminal may transmit the biometric feature image to the local safe area, and extract the biometric feature information from the biometric feature image in the local safe area. In an embodiment, after receiving the encrypted video data, the acceptance terminal internally forwards the encrypted video data to the local safe area, decrypts the encrypted video data in the safe area, to obtain the video data, and then determines the biometric feature image from the video data. Furthermore, the biometric feature image is processed in the local safe area, to obtain the biometric feature information.

In an embodiment, the acceptance terminal may extract the biometric feature information from the biometric feature image in the local safe area according to a preset image feature extraction strategy. The preset image feature extraction strategy may be a preset image feature extraction algorithm, a pre-trained feature extraction ML model, or the like.

In an embodiment, the biometric feature image includes a face image. The biometric feature information includes face position information, a target face depth map, and a target face color map. Step S204, that is, the step of extracting biometric feature information from the biometric feature image in a local safe area specifically includes: identifying face feature points in the face image in the local safe area, to obtain the face position information; determining candidate face depth maps and candidate face color maps included in the face image; performing denoising processing on the candidate face depth maps, to obtain the target face depth map; and screening, from the candidate face color maps, the target face color map that meets a preset condition.

The target face depth map is an image reflecting a distance between a surface of a target object and a viewpoint. Each pixel value in the target face depth map is an actual distance between a sensor in the video acquisition device and a target object. The target face color map is a Red-Green-Blue (RGB) map of a face, and may intuitively reflect the face. The target face color map and the target face depth map are registered, and pixels are in a one-to-one correspondence.

Specifically, the acceptance terminal may identify face feature points in the face image in the local safe area, to obtain the face position information. For example, the acceptance terminal may identify the facial organs such as the outline, the hair style, the ears, the eyes, the nose, and the mouth of the face, and then determine the position information of the facial organs, for example, the distance between the two eyes, the angle between the nose and the eyes, or the distance between the mouth and the nose.

In an embodiment, the acceptance terminal may extract a face feature image from the face image by using a convolutional neural network, identify face organs according to the face feature image, and further determine coordinate positions of the face organs or each other.

In an embodiment, the video acquisition device may acquire a face image by using a 3D structured light camera. The acquired face image includes a plurality of groups of face depth maps and face color maps, which may be also referred to as candidate face depth maps and candidate face color maps. The acceptance terminal may perform denoising processing on the candidate face depth maps in the local safe area, to obtain the target face depth map. The denoising manner may specifically performing denoising by using an average filter, an adaptive Wiener filter, a median filter, wavelet denoising, and the like, or may be other image denoising manners. This is not limited in this application. The acceptance terminal may screen a face color map that meets conditions such as regular features, centering of a portrait, and non-closed eyes from a plurality of candidate face color maps as the target face color map. It may be understood that, the target face depth map and the target face color map determined by the acceptance terminal are mutually registered, and the pixels are in a one-to-one correspondence.

In an embodiment, the face position information, the target face depth map, and the target face color map are effective face information used for verifying the user identity of the user corresponding to the face image. A quantity of target face depth maps and target face color maps may be specifically determined to be one or more according to an actual situation. This is not limited in this embodiment of this application.

In the foregoing embodiments, the face position information is extracted from the face image in the local safe area, and the high-quality target face depth map and target face color map are screened from the candidate face depth maps and the candidate face color maps. This is equivalent to performing preliminary preprocessing on the face image to obtain effective face information. The effective face information is then transmitted to the verification server for identity verification, so that the transmission efficiency can be well improved, and the time consumption for algorithm matching performed by verification server is reduced.

S206. Encrypt the biometric feature information in the local safe area, to obtain encrypted feature information, and transmit the encrypted feature information to an application run in a local normal area within the running environment of the computer device.

The local normal area is a normal area of the acceptance terminal. The normal area may be also referred to as the REE. The normal area, that is, an area that all general computer devices can provide, in which a common operating system and application may be run. For example, the Android system is run in the Non Security World, that is, is run in the normal area. The application run in the normal area can perform data communication with the outside through the network, and thus is easily attacked maliciously by a third party. Therefore, the normal area cannot ensure the security of data like the safe area.

Specifically, the acceptance terminal may encrypt the biometric feature information in the local safe area, to obtain the encrypted feature information, and transmit the encrypted feature information to the application run in the local normal area. The application may be specifically an application corresponding to the verification server, and is used for performing data communication with the verification server.

In an embodiment, hardware and software environments of the acceptance terminal may be reformed in advance, to obtain a partial area through division from the normal area of the acceptance terminal to serve as the safe area. Specifically, the hardware and software environments of the acceptance terminal may be reformed by using a trustzone technology. Therefore, a safe area is provided on a processor of the acceptance terminal and exists in parallel with the normal area. The safe area may be provided with an isolated execution environment, to ensure isolated execution, integrity of trusted applications, confidentiality of trusted data, safe storage, and the like.

In an embodiment, the step of encrypting the biometric feature information in the local safe area, to obtain encrypted feature information, and transmitting the encrypted feature information to an application run in a local normal area may specifically include: encrypting the biometric feature information in the local safe area, to obtain encrypted feature information; encrypting the encrypted feature information by using a second private key, to obtain a second signature; and transmitting the encrypted feature information and the second signature to the application run in the local normal area.

Specifically, the acceptance terminal may encrypt the biometric feature information in the local safe area by using the symmetric key, to obtain encrypted feature information. The encrypted feature information is encrypted by using the second private key corresponding to the acceptance terminal, to obtain the second signature. The acceptance terminal may transmit the encrypted feature information and the second signature to the application run in the local normal area, and transmit the second signature and the encrypted feature information to the verification server through the application. In this way, the security of the transmission of the biometric feature information is ensured, and the reliability of the data source can be also ensured by using the second signature, thereby greatly enhancing the security of the transmission of the biometric feature information.

S208. Transmit the encrypted feature information to a verification server through the application via a network connection.

The transmitted encrypted feature information is used for instructing the verification server to decrypt the encrypted feature information, to obtain the biometric feature information, and perform identity verification according to the decrypted biometric feature information, to obtain an identity verification result. The identity verification result is a result obtained by performing identity verification on the biometric feature information. The identity verification result is obtained after the encrypted feature information is decrypted and verified. Specifically, the identity verification result may be a result indicating that the verification succeeds or the verification fails, or may be user identity information of a determined corresponding user. The user identity information is, for example, a user identifier or a user account. Specifically, the acceptance terminal may transmit the encrypted feature information to the verification server through the application. After receiving the encrypted feature information, the verification server decrypts the encrypted feature information by using a corresponding decryption key, to obtain biometric feature information, and performs identity verification according to the decrypted biometric feature information, to obtain the identity verification result.

In an embodiment, after receiving the encrypted feature information, the verification server may first perform a validity check of service authentication, that is, check the validity of a network request, namely, the integrity of network data. After detection of the validity of the service authentication succeeds, identity verification is then performed. In an embodiment, the verification server may perform living body detection according to the decrypted biometric feature information, to detect whether a creature corresponding to the biometric feature information is a living body. When a living body is detected, identity verification is then performed according to the biometric feature information.

In an embodiment, the performing identity verification on the biometric feature information specifically refers to the process of performing biometric identification according to the biometric feature information. Specifically, the verification server may perform feature extraction on the biometric feature information by using a convolutional neural network structure, to obtain a corresponding feature vector such as a face feature vector, a fingerprint feature vector, or an iris feature vector. Further, the feature vector is compared with all feature vector samples in a pre-stored feature vector sample set one by one, to determine a similarity between the feature vector and each feature vector sample. The similarity may be understood as a confidence level at which a user corresponding to the feature vector is the same user as a user corresponding to the feature vector sample. A higher similarity between the feature vector and the feature vector sample indicates more credibility that the user corresponding to the feature vector is the same user as the user corresponding to the feature vector sample.

In an embodiment, the acceptance terminal may calculate a similarity between the feature vector and the feature vector sample, further determine whether the similarity is greater than or equal to a preset similarity threshold, determines that a to-be-verified user is a user corresponding to the feature vector sample with a corresponding similarity greater than or equal to the preset similarity threshold, and further obtains user identity information corresponding to the determined user. The preset similarity threshold is a value that is preset for determining a minimum similarity of the identity verification result. The preset similarity threshold is a maximum tolerance that is determined based on a large number of experiments and allowed in identity verification by comparing feature vectors.

The calculating the similarity between the feature vector and the feature vector sample may be specifically calculating a difference between the two feature vectors. A larger difference between the feature vectors indicates a lower similarity, and a smaller difference between the feature vectors indicates a higher similarity. The similarity may be a cosine similarity, a Hamming distance of respective perceptual hash values between images, or the like.

In an embodiment, the acceptance terminal encrypts the biometric feature information in the local safe area, to obtain encrypted feature information; encrypts the encrypted feature information by using a second private key, to obtain a second signature; transmits the encrypted feature information and the second signature to the application run in the local normal area, and transmits the encrypted feature information and the second signature to the verification server through the application, the encrypted feature information and the second signature being used for instructing the verification server to verify the second signature according to a second public key corresponding to the second private key; and decrypts the encrypted feature information after the second signature is verified successfully, to obtain the biometric feature information, and performs identity verification according to the decrypted biometric feature information, to obtain the identity verification result.

In an embodiment, the verification server may verify the second signature by using a second public key corresponding to the second private key, decrypt the encrypted feature information by using a corresponding symmetric key after the second signature is verified successfully, to obtain the biometric feature information, and perform identity verification according to the decrypted biometric feature information, to obtain the identity verification result. In this way, the security of the transmission of the biometric feature information is ensured, and the reliability of the data source can be also ensured by using the second signature, thereby greatly enhancing the security of the transmission of the biometric feature information.

In an embodiment, the biometric feature image includes a face image. The biometric feature information includes face position information, a target face depth map, and a target face color map. The encrypted feature information is transmitted to the verification server through the application, and the verification server decrypts the encrypted feature information, to obtain the face position information, the target face depth map, and the target face color map. The verification server processes the face position information, the target face depth map, and the target face color map, to obtain a face feature vector, and compares the face feature vector with a face feature vector sample, to obtain the identity verification result.

Specifically, the verification server may perform living body detection according to the face position information, the target face depth map, and the target face color map that are obtained through decryption. When a living body is detected, the verification server processes the face position information, the target face depth map, and the target face color map by using the convolutional neural network structure, to obtain a corresponding face feature vector. Further, the face feature vector is then compared with all face feature vector samples in a pre-stored face feature vector sample set one by one, to determine user identity information of the user corresponding to the face feature vector.

In the foregoing embodiments, the face position information, the target face depth map, and the target face color map are encrypted and transmitted to the verification server through the application, so that the verification server may process the face position information, the target face depth map, and the target face color map, to obtain the face feature vector. The face feature vector is then compared with the face feature vector sample, to accurately determine an identity of the user corresponding to the face image.

S210. Receive, through the application and via the network connection, the identity verification result returned by the verification server.

Specifically, after completing the identity verification and obtaining the identity verification result, the verification server may return the identity verification result to the application through a network connection. The acceptance terminal may receive, through the application, the identity verification result returned by the verification server.

In an embodiment, the identity verification result includes user identity information determined after identity verification is performed on the biometric feature information, which specifically includes a user identifier of the user, an associated resource account number, and the like.

In an embodiment, after receiving the identity verification result returned by the verification server, the acceptance terminal may perform corresponding service processing according to the identity verification result. For example, when being an access control device, the acceptance terminal may perform a release or non-release operation according to the identity verification result. When being an offline payment device, the acceptance terminal may perform a resource transfer operation according to the identity verification result.

In the foregoing identity verification method, the biometric feature information is extracted from the biometric feature image in the local safe area, and the biometric feature information is then encrypted, to obtain the encrypted feature information. The encrypted feature information is transmitted to the verification server through the application run in the local normal area for identity verification, to obtain the identity verification result. In this way, the biometric feature information is extracted from the biometric feature image in a local safe area, to effectively avoid the risk of malicious middleman attack during operation When the biometric feature information is transmitted to the verification server to perform identity verification, once the biometric feature information is to be transmitted to the normal area, encryption is performed, so that the risk that the biometric feature information is tampered with can be effectively avoided, thereby greatly improving the security of identity verification.

In an embodiment, the identity verification method further includes the step of triggering video acquisition. The step specifically includes: presenting an operating interface through the application; generating a video acquisition instruction in response to detecting a trigger operation on the operating interface; and transmitting the video acquisition instruction to the video acquisition device, the video acquisition instruction being used for instructing the video acquisition device to acquire video data including biometric features. The trigger operation is a preset operation on the operating interface, is used for triggering to generate the video acquisition instruction, and may be specifically a touch operation, a cursor operation, a key operation, a voice operation, or the like. The touch operation may be a touch clicking operation, a touch pressing operation, or a touch sliding operation, and the touch operation may be a single-point touch operation or a multi-point touch operation. The cursor operation may be an operation of controlling a cursor to click or an operation of controlling a cursor to press. The key operation may be a virtual key operation, a physical key operation, or the like.

Specifically, the acceptance terminal may present the operating interface through the application, and the user may perform related operations through the operating interface. When detecting a trigger operation on the operating interface, the acceptance terminal generates a video acquisition instruction. The acceptance terminal further transmits the video acquisition instruction to the video acquisition device, and the video acquisition device scans the target object to acquire video data after receiving the video acquisition instruction.

The step is described below in detail by using examples. The acceptance terminal may first present an operating interface through the application. A virtual button for triggering a face acquisition operation is presented in the operating interface. A user may click on the virtual button to generate a face acquisition instruction. The acceptance terminal transmits the face acquisition instruction to the video acquisition device, and the video acquisition device scans a face area of the target object by using the camera, to obtain video data including a face.

In an embodiment, the video acquisition device may encrypt the acquired video data and transmit the encrypted video data to the safe area of the acceptance terminal, so that the acceptance terminal may determine the biometric feature image from the video data in the safe area.

In the foregoing embodiments, through the operating interface of the application, the user may trigger the action of acquiring the video data by the video acquisition device, to conveniently and quickly obtain the video data including the biometric feature.

In an embodiment, step S204, that is, the step of extracting biometric feature information from the biometric feature image in a local safe area specifically includes: performing living body detection on the biometric feature image in the local safe area, to obtain a detection result; and extracting the biometric feature information from the biometric feature image in response to the detection result indicating that a living body is detected.

The living body detection refers to detecting whether a target object in a biometric feature image is a living body object. Specifically, the acceptance terminal may extract a feature map (also referred to as a feature vector) representing the biometric features from the biometric feature image in the local safe area, and then classify the biometric feature image according to the extracted feature map. When the extracted feature map conforms to a feature map of a living body biometric image, the biometric feature image is classified into a living body biometric image class. When the extracted feature map conforms to a feature map of a non-living body biometric image, the biometric feature image is classified into a non-living body biometric image class. Further, when the detection result indicates that a living body is detected, that is, the biometric feature image belongs to the living body biometric image class, the acceptance terminal then extracts the biometric feature information from the biometric feature image.

In an embodiment, the acceptance terminal performs living body detection on the biometric feature image in the local safe area. When a non-living body is detected, the acceptance terminal may refuse to transmit the biometric feature image to the verification server, to protect the verification server from being attacked by illegal images. In an embodiment, the acceptance terminal may regularly remove non-living body biometric images in local, to relieve buffer pressure.

It may be understood that, to ensure the security of identity verification, living body detection is performed at the acceptance terminal, and for a simple attack of a 2D head mold or a 3D head mold, the acceptance terminal may directly refuse the attack, achieving a relatively high efficiency and omitting a network request, so as to protect the verification server from being attacked by illegal images.

Figure 4:
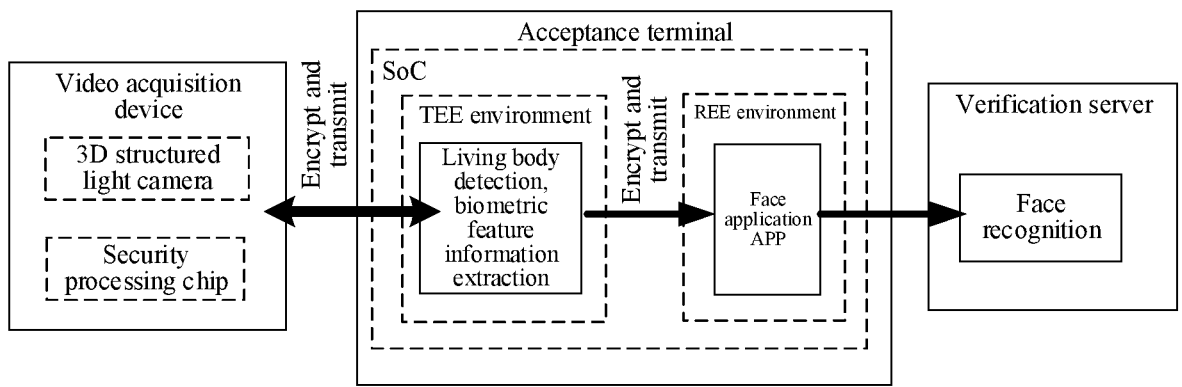
FIG. 4 is an architectural diagram of an identity verification system according to an embodiment.
Figure 5:
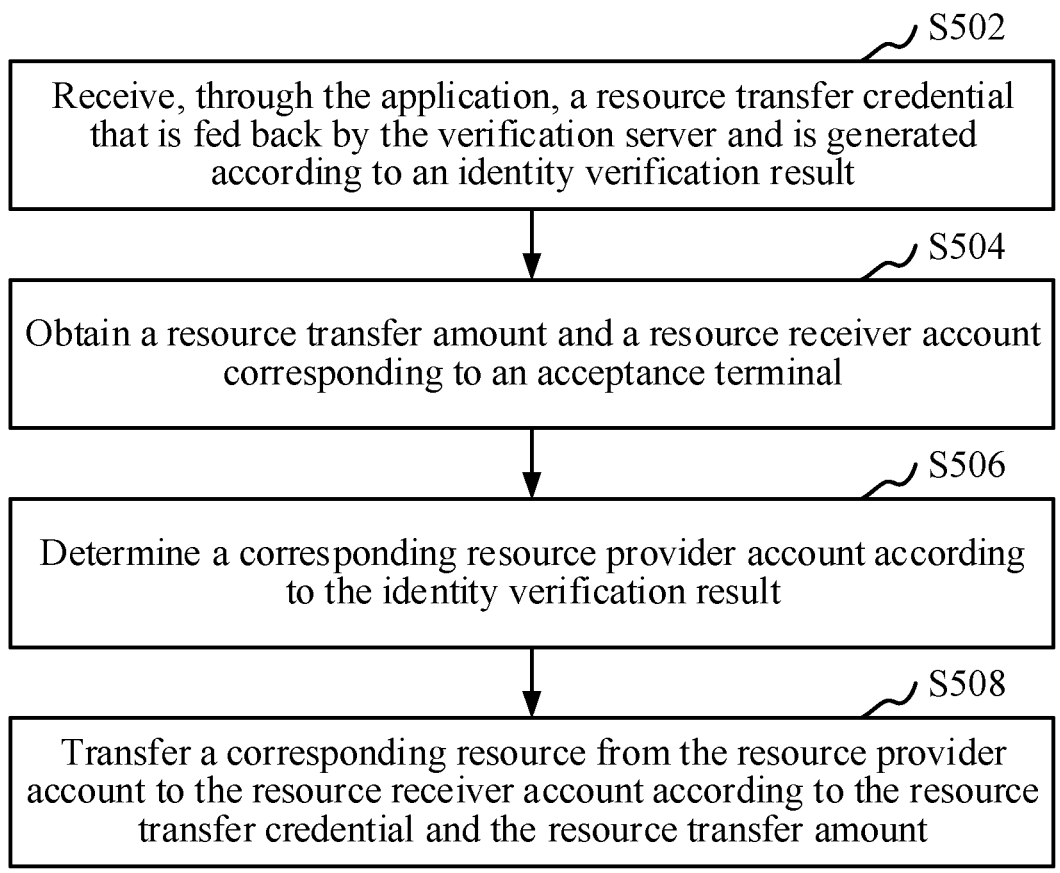
FIG. 5 is a schematic flowchart of a step of triggering a resource transfer in an embodiment.

FIG. 4 is an architectural diagram of an identity verification system according to an embodiment. As shown in FIG. 4, the video acquisition device may acquire face video data by using a 3D structured light camera, encrypt the face video data by using a security processing chip, and transmit the encrypted face video data to the acceptance terminal (the acceptance terminal herein may be specifically a teller machine). The acceptance terminal may forward the encrypted face video data to the TEE environment (that is, the local safe area) inside a system on chip (SoC) by using the SoC. The acceptance terminal takes out the encrypted face video data from the TEE environment, decrypts the encrypted face video data, performs face living body detection, and preliminarily determines whether there is a living body. When a living body is detected, a face position may be positioned, and an intermediate calculation result is generated. The intermediate calculation result is encrypted in the TEE environment, and is transmitted to the REE environment of the acceptance terminal. The data is transferred to the verification server through a face application (APP) run in the REE environment. The verification server may be specifically a server providing a cloud server. The verification server performs identity verification according to the received data.

In the foregoing embodiments, before extracting the biometric feature information and transmitting the biometric feature information to the verification server, the acceptance terminal first performs living body detection. For a simple attack caused by a non-living body, the acceptance terminal directly refuses the attack, thereby achieving a relatively high efficiency, omitting a network request, reducing a time consumption of algorithm matching in the backend of the verification server, and further improving the efficiency of identity verification.

In an embodiment, the step of performing living body detection on the biometric feature image in the local safe area, to obtain a detection result specifically includes: extracting, by using a convolutional layer of an identification model, a feature map representing biometric features from the biometric feature image in the local safe area; classifying the biometric feature image according to the feature map by using a fully connected layer of the identification model, to obtain a confidence level at which the biometric feature image is a living body biometric image, the confidence level representing a probability that a living body is detected; and determining that a living body is detected in response to the confidence level being greater than or equal to a confidence threshold.

The identification model is a ML model having feature extraction and feature identification capabilities after being trained. Machine learning as a full name is briefly referred to as ML. The ML model may have the feature extraction and feature identification capabilities through sample learning. The ML model may include a neural network model, a support vector machine, or a logistic regression model, or the like.

The convolutional layer is a feature extraction layer in the convolutional neural network. The convolutional layer may have a plurality of layers, each convolutional layer has a corresponding convolution kernel, and there may be a plurality of convolution kernels in the each layer. The convolutional layer performs convolution operation on an input image by using the convolution kernel, and extracts image features to obtain a feature map as an operation result.

The fully connected layer (FC) is a feature classification layer in the convolutional neural network, and is used for mapping an extracted feature map to a corresponding classification according to a learned distributed feature mapping relationship.

In an embodiment, the identification model may be a complicated network model formed by interconnecting a plurality of network structures. The identification model may include a plurality of convolutional layers, each convolutional layer has corresponding model parameters, and there may be a plurality of model parameters in the each layer. The model parameters in the each convolutional layer perform a linear or non-linear variation on the input image, to obtain a feature map as an operation result. The each convolutional layer receives an operation result of a previous layer, and through an operation of the convolutional layer, outputs an operation result of the current layer to a next layer. The model parameters are parameters in a model structure and can reflect a correspondence between an output and an input of the each layer.

In an embodiment, the acceptance terminal may input the biometric feature image into the identification model in the local safe area, and perform a linear or non-linear variation on the inputted biometric feature image layer by layer through the convolutional layer included in the identification model, until a last convolutional layer in the identification model completes the linear or non-linear variation, so that the acceptance terminal obtains, according to an output result of the last convolutional layer of the identification model, a feature map extracted for the current inputted biometric feature image.

Further, the acceptance terminal may use the feature image outputted by the last convolutional layer as an input of the fully connected layer, to obtain a confidence level at which the biometric feature image is a living body biometric image. The confidence level may be directly a score that the biometric feature image outputted by the fully connected layer is the living body biometric image. The confidence level may be alternatively a value in a value range (0, 1) obtained after the acceptance terminal normalizes, by using a regression layer (a softmax layer), scores outputted by the fully connected layer. In this case, the confidence level may be also understood as a probability that the biometric feature image is the living body biometric image. It is determined that a living body is detected in response to the confidence level being greater than or equal to the confidence threshold.

In the foregoing embodiments, through the feature map outputted by the convolutional layer of the identification model, the feature image representing the biometric features can be better extracted, and the classification of the fully connected layer is then used according to the feature image to obtain the confidence level at which the biometric feature image is the living body biometric image, so as to accurately determine, according to the confidence level, whether a living body is detected.

In an embodiment, the identity verification method further includes the step of triggering a resource transfer operation. The step specifically includes: receiving, through the application, a resource transfer credential that is returned by the verification server and is generated according to the identity verification result; and triggering a resource transfer operation according to the resource transfer credential, the resource transfer credential being a necessary credential for a user to transfer a resource. Specifically, the verification server may generate a corresponding resource transfer credential according to the identity verification result, and feeds back the resource transfer credential to the acceptance terminal. The acceptance terminal receives, through the application, the resource transfer credential returned by the verification server, and triggers a resource transfer operation according to the resource transfer credential.

In an embodiment, the resource transfer credential has timeliness and one-time usage. The timeliness means that when a resource transfer operation is not performed according to the resource transfer credential within a preset time period, the resource transfer credential loses effectiveness. One-time usage means that a resource transfer operation may be performed only once according to the resource transfer credential, and the resource transfer credential is invalid after the resource transfer succeeds.

In an embodiment, the verification server may randomly generate a current resource transfer credential according to a user identifier and a timestamp. Alternatively, the verification server may further randomly generate a current resource transfer credential according to information such as a user identifier, a timestamp, geographical position information of the acceptance terminal, and a merchant identifier corresponding to the acceptance terminal.

In an embodiment, in an offline payment scenario, the verification server returns the identity verification result and the resource transfer credential to the acceptance terminal, the application of the acceptance terminal may transfer the resource transfer credential to a merchant application run in the local normal area, and the merchant application performs resource transfer according to the resource transfer credential.

In the foregoing embodiments, the verification server may return the resource transfer credential generated according to the identity verification result, and the resource transfer credential is used for triggering the resource transfer operation. In this way, the corresponding resource transfer operation may be triggered only when the resource transfer credential generated according to the identity verification result is received, thereby ensuring the validity and security of the resource transfer operation, and further implementing the safe offline payment.

In an embodiment, the identity verification method may be specifically applicable to an offline payment scenario. The identity verification method further includes the step of triggering a resource transfer. The step specifically includes the following steps:

S502. Receive, through the application, a resource transfer credential that is returned by the verification server and is generated according to the identity verification result.

Specifically, the verification server may generate a corresponding resource transfer credential according to the identity verification result, and feeds back the resource transfer credential to the acceptance terminal. The acceptance terminal receives, through the application, a resource transfer credential that is returned by the verification server and is generated according to the identity verification result.

S504. Obtain a resource transfer amount and a resource receiver account corresponding to the acceptance terminal.

Specifically, the acceptance terminal may determine, through the merchant application, a resource transfer amount and a resource receiver account associated with the merchant application. In an embodiment, the user may select, through the merchant application, an item that needs to be purchased, and determine an equal-valued resource quantized value, also referred to as a resource transfer amount, corresponding to the selected item.

S506. Determine a corresponding resource provider account according to the identity verification result.

Specifically, after determining the identity (including the user identifier) of the user according to the biometric feature information, the verification server may determine a user account of the user from an association relationship between the stored user identifier and the user account. In the application scenario provided in this embodiment, the user account corresponding to the user is the resource provider account.

S508. Transfer a corresponding resource from the resource provider account to the resource receiver account according to the resource transfer credential and the resource transfer amount.

Specifically, the acceptance terminal may transmit the resource transfer credential to the merchant application, and the merchant application transfers a corresponding resource from the resource provider account to the resource receiver account according to the resource transfer credential and the resource transfer amount. In this way, the user completes the safe offline payment.

A scenario of a self-service payment in a checkout of a supermarket is used as an example below for description. A user may add goods to a shopping list by using a code scanner without a mobile phone or a wallet. A video acquisition instruction is triggered through an operating interface provided by a teller machine of the supermarket, and a user face is scanned by using the video acquisition device. The video acquisition device encrypts acquired video data and transmits the encrypted video data to the teller machine. The teller machine performs the identity verification method provided in the foregoing embodiments, to obtain an identity verification result and a resource transfer credential. The teller machine performs deduction from an account of the user according to the resource transfer credential and a resource transfer amount, and pays to a merchant. In this way, the user can perform safe payment by using the face, without the wallet and the mobile phone in the whole process.

In the foregoing embodiments, the corresponding resource in the resource provider account is transferred to the resource receiver account according to the resource transfer credential and the resource transfer amount, thereby implementing the safe offline payment.

Figure 6:
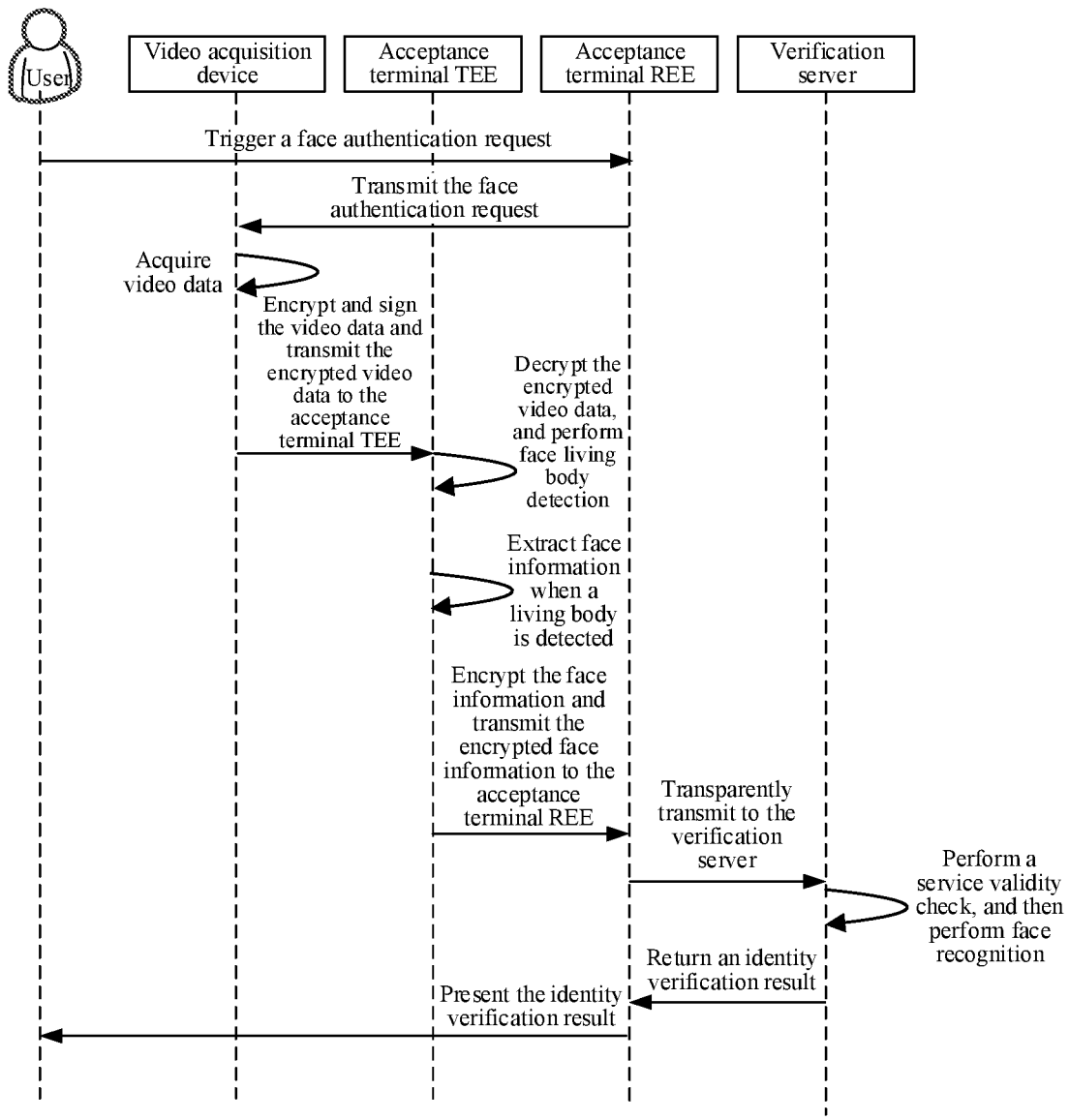
FIG. 6 is a time sequence diagram of a face authentication method in an embodiment.

The following uses facial recognition for identity verification as an example to describe the technical solution of this application in detail. FIG. 6 is a time sequence diagram of a face authentication method in an embodiment. As shown in FIG. 6, a user triggers a face authentication request through an application run in a normal area (a REE) of the acceptance terminal. The application run in the normal area (the REE) of the acceptance terminal transmits the face authentication request to the video acquisition device. The video acquisition device scans a target object according to the face authentication request, to obtain video data. The video acquisition device encrypts and signs the video data and transmits the encrypted video data to a safe area (a TEE) of the acceptance terminal. The acceptance terminal decrypts a data source in the safe area, and performs face living body detection. When a living body is detected, face information is extracted, and is encrypted and transmitted to the application run in the normal area. The data is transparently transmitted to a verification server through the application. The verification server performs a service validity check according to the received data, and then performs face recognition, to obtain an identity verification result. The verification server feeds back the identity verification result to the application, and presents the identity verification result through the application.

Figure 7:
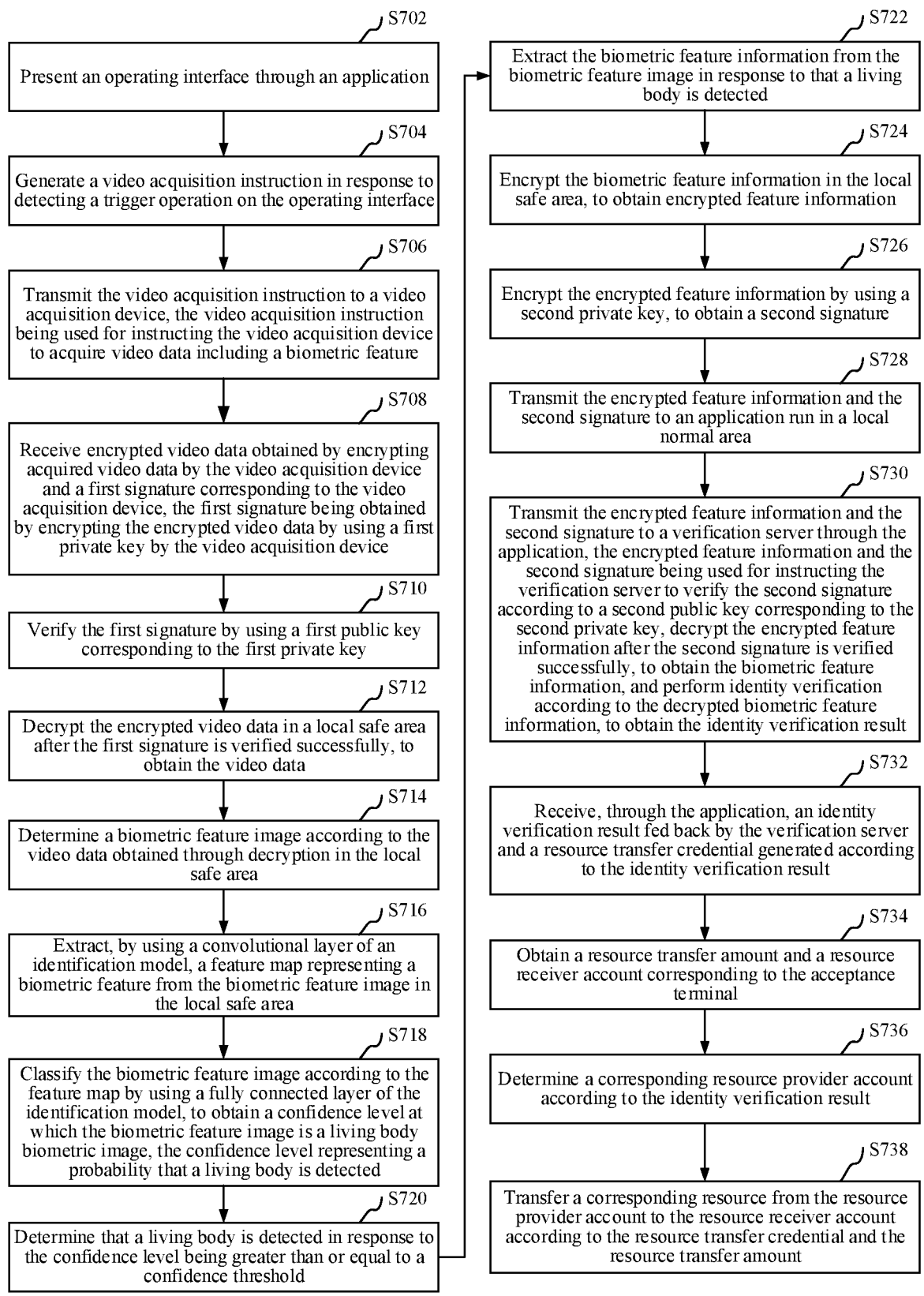
FIG. 7 is a schematic flowchart of an identity verification method in an embodiment.

In a specific embodiment, as shown in FIG. 7, the identity verification method specifically includes the following steps:

S702. Present an operating interface through an application.

S704. Generate a video acquisition instruction in response to detecting a trigger operation on the operating interface.

S706. Transmit the video acquisition instruction to a video acquisition device, the video acquisition instruction being used for instructing the video acquisition device to acquire video data including a biometric feature.

S708. Receive encrypted video data obtained by encrypting video data acquired by the video acquisition device and a first signature corresponding to the video acquisition device, the first signature being obtained by encrypting the encrypted video data by using a first private key by the video acquisition device.

S710. Verify the first signature by using a first public key corresponding to the first private key.

S712. Decrypt the encrypted video data in a local safe area after the first signature is verified successfully, to obtain the video data.

S714. Determine a biometric feature image according to the video data obtained through decryption in the local safe area.

S716. Extract, by using a convolutional layer of an identification model, a feature map representing a biometric feature from the biometric feature image in the local safe area.

S718. Classify the biometric feature image according to the feature map by using a fully connected layer of the identification model, to obtain a confidence level at which the biometric feature image is a living body biometric image, the confidence level representing a probability that a living body is detected.

S720. Determine that a living body is detected in response to the confidence level being greater than or equal to a confidence threshold.

S722. Extract the biometric feature information from the biometric feature image in response to that a living body is detected.

S724. Encrypt the biometric feature information from the local safe area, to obtain encrypted feature information.

S726. Encrypt the encrypted feature information by using a second private key, to obtain a second signature.

S728. Transmit the encrypted feature information and the second signature to an application run in a local normal area.

S730. Transmit the encrypted feature information and the second signature to a verification server through the application, the encrypted feature information and the second signature being used for instructing the verification server to verify the second signature according to a second public key corresponding to the second private key, decrypt the encrypted feature information after the second signature is verified successfully, to obtain the biometric feature information, and perform identity verification according to the decrypted biometric feature information, to obtain the identity verification result.

S732. Receive, through the application, an identity verification result returned by the verification server and a resource transfer credential generated according to the identity verification result.

S734. Obtain a resource transfer amount and a resource receiver account corresponding to the acceptance terminal.

S736. Determine a corresponding resource provider account according to the identity verification result.

S738. Transfer a corresponding resource from the resource provider account to the resource receiver account according to the resource transfer credential and the resource transfer amount.

In the foregoing identity verification method, the biometric feature information is extracted from the biometric feature image in the local safe area, and the biometric feature information is then encrypted, to obtain the encrypted feature information. The encrypted feature information is transmitted to the verification server through the application run in the local normal area for identity verification, to obtain the identity verification result. In this way, the biometric feature information is extracted from the biometric feature image in a local safe area, to effectively avoid the risk of malicious middleman attack during operation When the biometric feature information is transmitted to the verification server to perform identity verification, once the biometric feature information is to be transmitted to the normal area, encryption is performed, so that the risk that the biometric feature information is tampered with can be effectively avoided, thereby greatly improving the security of identity verification.

FIG. 7 is a schematic flowchart of an identity verification method in an embodiment. Steps in the flowchart in FIG. 7 are displayed sequentially based on indication of arrows, but the steps are not necessarily performed sequentially based on the sequence indicated by the arrows. Unless otherwise explicitly specified in this application, execution of the steps is not strictly limited, and the steps may be performed in other sequences. In addition, at least some steps in FIG. 7 may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

Figure 8:
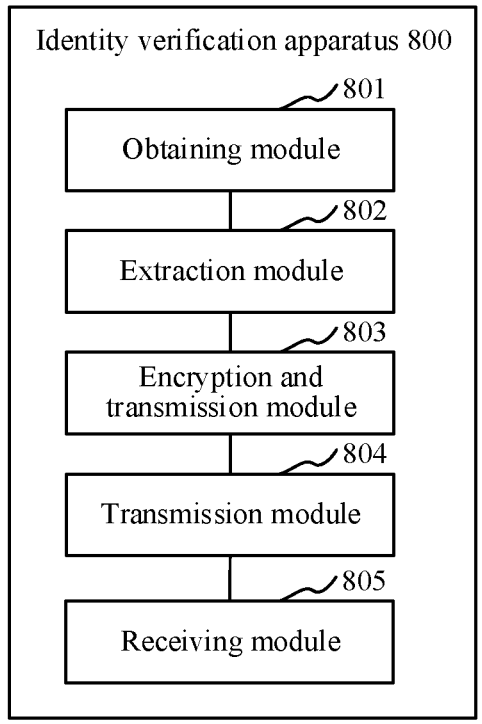
FIG. 8 is a structural block diagram of an identity verification apparatus in an embodiment.

As shown in FIG. 8, in an embodiment, an identity verification apparatus 800 is provided. The identity verification apparatus 800 has a function of implementing the foregoing method embodiments. The function may be implemented by hardware or may be implemented by hardware executing corresponding software. The identity verification apparatus 800 may be the foregoing acceptance terminal 120 in FIG. 1, or may be disposed in the acceptance terminal 120. As shown in FIG. 8, the identity verification apparatus 800 includes: an obtaining module 801, an extraction module 802, an encryption and transmission module 803, a transmission module 804, and a receiving module 805.

The obtaining module 801 is configured to obtain a biometric feature image.

The extraction module 802 is configured to extract biometric feature information from the biometric feature image in a local safe area.

The encryption and transmission module 803 is configured to: encrypt the biometric feature information in the local safe area, to obtain encrypted feature information, and transmit the encrypted feature information to an application run in a local normal area.

The transmission module 804 is configured to: transmit the encrypted feature information to a verification server through the application, the transmitted encrypted feature information being used for instructing the verification server to decrypt the encrypted feature information, to obtain the biometric feature information, and perform identity verification according to the decrypted biometric feature information, to obtain an identity verification result.

The receiving module 805 is configured to receive, through the application, the identity verification result returned by the verification server.

In an embodiment, the obtaining module 801 is further configured to: receive encrypted video data obtained by encrypting video data acquired by a video acquisition device and a first signature corresponding to the video acquisition device, the first signature being obtained by encrypting the encrypted video data by using a first private key by the video acquisition device; verify the first signature by using a first public key corresponding to the first private key; decrypt the encrypted video data in the local safe area after the first signature is verified successfully, to obtain video data; and determine the biometric feature image according to the video data obtained through decryption in the local safe area.

In an embodiment, the identity verification apparatus 800 further includes a presentation module 806 and a generation module 807. The presentation module 806 is configured to present an operating interface through the application. The generation module 807 is configured to generate a video acquisition instruction in response to detecting a trigger operation on the operating interface. The transmission module 804 is further configured to transmit the video acquisition instruction to the video acquisition device, the video acquisition instruction being used for instructing the video acquisition device to acquire video data including biometric features.

In an embodiment, the extraction module 802 is further configured to: perform living body detection on the biometric feature image in the local safe area, to obtain a detection result; and extract the biometric feature information from the biometric feature image in response to the detection result indicating that a living body is detected.

In an embodiment, the extraction module 802 is further configured to: extract, by using a convolutional layer of an identification model, a feature map representing biometric features from the biometric feature image in the local safe area; classify the biometric feature image according to the feature map by using a fully connected layer of the identification model, to obtain a confidence level at which the biometric feature image is a living body biometric image, the confidence level representing a probability that a living body is detected; and determine that a living body is detected in response to the confidence level being greater than or equal to a confidence threshold.

In an embodiment, the biometric feature image includes a face image. The biometric feature information includes face position information, a target face depth map, and a target face color map. The extraction module is further configured to: identify face feature points in the face image in the local safe area, to obtain the face position information; determine candidate face depth maps and candidate face color maps included in the face image; perform denoising processing on the candidate face depth maps, to obtain the target face depth map; and screen, from the candidate face color maps, the target face color map that meets a preset condition.

In an embodiment, the transmitted encrypted feature information is used for: instructing the verification server to decrypt the encrypted feature information, to obtain the face position information, the target face depth map, and the target face color map, and instructing the verification server to process the face position information, the target face depth map, and the target face color map, to obtain a face feature vector, and compare the face feature vector with a face feature vector sample, to obtain the identity verification result.

In an embodiment, the encryption and transmission module 803 is configured to: encrypt the biometric feature information in the local safe area, to obtain encrypted feature information; encrypt the encrypted feature information by using a second private key, to obtain a second signature; and transmit the encrypted feature information and the second signature to the application run in the local normal area. The transmission module 804 is further configured to: transmit the encrypted feature information and the second signature to the verification server through the application; and the encrypted feature information and the second signature being used for instructing the verification server to verify the second signature according to a second public key corresponding to the second private key, decrypt the encrypted feature information after the second signature is verified successfully, to obtain the biometric feature information, and perform identity verification according to the decrypted biometric feature information, to obtain the identity verification result.

Figure 9:
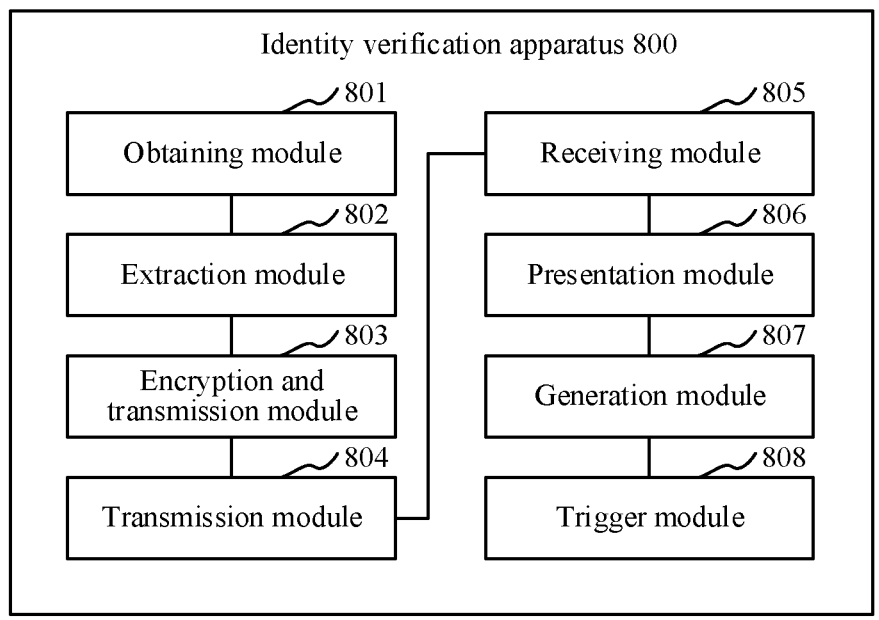
FIG. 9 is a structural block diagram of an identity verification apparatus in another embodiment.

Referring to FIG. 9, in an embodiment, the identity verification apparatus 800 further includes a trigger module 808. The receiving module 805 is further configured to receive, through the application, a resource transfer credential that is returned by the verification server and is generated according to the identity verification result. The trigger module 808 is configured to trigger a resource transfer operation according to the resource transfer credential.

In an embodiment, the obtaining module 801 is further configured to: obtain a resource transfer amount and a resource receiver account corresponding to the acceptance terminal; and determine a corresponding resource provider account according to the identity verification result. The trigger module 808 is further configured to transfer a corresponding resource from the resource provider account to the resource receiver account according to the resource transfer credential and the resource transfer amount.

In the foregoing identity verification apparatus, the biometric feature information is extracted from the biometric feature image in the local safe area, and the biometric feature information is then encrypted, to obtain the encrypted feature information. The encrypted feature information is transmitted to the verification server through the application run in the local normal area for identity verification, to obtain the identity verification result. In this way, the biometric feature information is extracted from the biometric feature image in a local safe area, to effectively avoid the risk of malicious middleman attack during operation When the biometric feature information is transmitted to the verification server to perform identity verification, once the biometric feature information is to be transmitted to the normal area, encryption is performed, so that the risk that the biometric feature information is tampered with can be effectively avoided, thereby greatly improving the security of identity verification.

Figure 10:
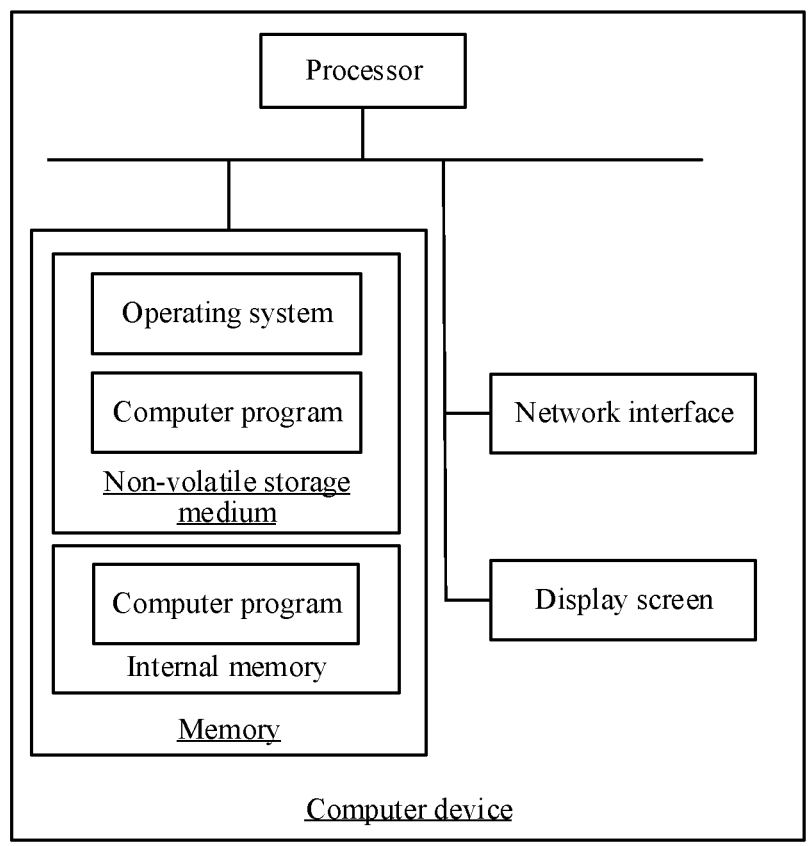
FIG. 10 is a structural block diagram of a computer device in an embodiment.

FIG. 10 is a diagram of an internal structure of a computer device in an embodiment. The computer device may be specifically the computer device 120 in FIG. 1. As shown in FIG. 10, the computer device includes a processor, a memory, a network interface, and a display screen that are connected by a system bus. The memory includes a non-volatile storage medium and an internal memory. The non-volatile storage medium of the computer device stores an operating system, and may further store a computer program. The computer program, when executed by the processor, may cause the processor to implement the identity verification method. The internal memory may also store a computer program. The computer program, when executed by the processor, may cause the processor to perform the identity verification method. The display screen of the computer device may be a liquid crystal display screen or an electronic ink display screen.

A person skilled in the art may understand that, the structure shown in FIG. 10 is only a block diagram of a part of a structure related to a solution of this application and does not limit the computer device to which the solution of this application is applied. Specifically, the computer device may include more or fewer components than those in the drawings, or include a combination of some components, or include different component layouts.

In an embodiment, the identity verification apparatus provided in this application may be implemented in a form of a computer program, and the computer program may run on the computer device shown in FIG. 10. The memory of the computer device may store program modules forming the identity verification apparatus, for example, the obtaining module, the extraction module, the encryption and transmission module, the transmission module, and the receiving module shown in FIG. 8. The computer program formed by the program modules causes the processor to perform the steps of the identity verification method in the embodiments of this application described in this specification.

For example, the computer device shown in FIG. 10 may perform step S202 by using the obtaining module in the identity verification apparatus shown in FIG. 8. The computer device may perform step S204 by using the extraction module. The computer device may perform step S206 by using the encryption and transmission module. The computer device may perform step S208 by using the transmission module. The computer device may perform step S210 by using the receiving module. In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

In an embodiment, a computer device is provided, including a processor and a memory, the memory storing a computer program, the computer program, when executed by the processor, causing the processor to perform the steps of the foregoing identity verification method. The steps of the identity verification method herein may be the steps of the identity verification method in the foregoing embodiments.

In an embodiment, a computer-readable storage medium is provided, storing a computer program, the computer program, when executed by a processor, causing the processor to perform the steps of the foregoing identity verification method. The steps of the identity verification method herein may be the steps of the identity verification method in the foregoing embodiments.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a Rambus (Rambus) direct RAM (RDRAM), a direct Rambus dynamic RAM (DRDRAM), and a Rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

What is claimed is:

1. An identity verification method, applicable to a computer device, the method comprising:
    obtaining a biometric feature image from a video acquisition device via an encrypted connection;
    extracting, in a local safe area within a running environment of the computer device, biometric feature information from the biometric feature image, the local safe area being a first type of execution environment;
    encrypting, in the local safe area, the biometric feature information, to obtain encrypted feature information, and transmitting the encrypted feature information to an application running in a local normal area within the running environment of the computer device, the local normal area being a second type of execution environment isolated from the first type of execution environment;
    transmitting the encrypted feature information to a verification server through the application via a network connection; and
    receiving, through the application and via the network connection, an identity verification result returned by the verification server, the identity verification result being obtained after the encrypted feature information is decrypted and verified by the verification server.

2. The method according to claim 1, wherein the obtaining a biometric feature image from a video acquisition device via an encrypted connection comprises:
    receiving, from the video acquisition device, encrypted video data and a first signature corresponding to the video acquisition device, wherein the video acquisition device generates the first signature by further encrypting the encrypted video data using a first private key;
    verifying the first signature by using a first public key corresponding to the first private key;
    decrypting the encrypted video data in the local safe area after the first signature is verified successfully, to obtain video data; and
    determining the biometric feature image according to the video data obtained through decryption in the local safe area.

3. The method according to claim 2, further comprising:
    presenting an operating interface through the application;

generating a video acquisition instruction in response to detecting a trigger operation on the operating interface; and transmitting the video acquisition instruction to the video acquisition device, the video acquisition instruction being used for instructing the video acquisition device to acquire video data comprising biometric features.

4. The method according to claim 1, wherein the extracting biometric feature information from the biometric feature image in a local safe area within a running environment of the computer device comprises:

performing living body detection on the biometric feature image in the local safe area, to obtain a detection result; and extracting the biometric feature information from the biometric feature image in response to the detection result indicating that a living body is detected in the biometric feature image.

5. The method according to claim 4, wherein the performing living body detection on the biometric feature image in the local safe area, to obtain a detection result comprises:

extracting, by using a convolutional layer of an identification model, a feature map representing biometric features from the biometric feature image in the local safe area;

classifying the biometric feature image according to the feature map by using a fully connected layer of the identification model, to obtain a confidence level at which the biometric feature image is a living body biometric image, the confidence level representing a probability that a living body is detected; and determining that a living body is detected in response to the confidence level being greater than or equal to a confidence threshold.

6. The method according to claim 1, wherein the biometric feature image comprises a face image, the biometric feature information comprises face position information, a target face depth map, and a target face color map, and the extracting biometric feature information from the biometric feature image in a local safe area within a running environment of the computer device comprises:

identifying face feature points in the face image in the local safe area, to obtain the face position information;

determining candidate face depth maps and candidate face color maps comprised in the face image;

performing denoising processing on the candidate face depth maps, to obtain the target face depth map; and screening, from the candidate face color maps, the target face color map that meets a preset condition.

7. The method according to claim 6, wherein the transmitted encrypted feature information is used for: instructing the verification server to decrypt the encrypted feature information, to obtain the face position information, the target face depth map, and the target face color map, and instructing the verification server to process the face position information, the target face depth map, and the target face color map, to obtain a face feature vector, and compare the face feature vector with a face feature vector sample, to obtain the identity verification result.

8. The method according to claim 1, wherein the encrypting the biometric feature information in the local safe area, to obtain encrypted feature information, and transmitting the encrypted feature information to an application run in a local normal area within the running environment of the computer device comprises:

encrypting the biometric feature information in the local safe area, to obtain encrypted feature information;

further encrypting the encrypted feature information by using a second private key, to obtain a second signature; and transmitting the encrypted feature information and the second signature to the application run in the local normal area; and the transmitting the encrypted feature information to a verification server through the application via a network connection comprises:

transmitting the encrypted feature information and the second signature to the verification server through the application via the network connection, the encrypted feature information and the second signature being used for instructing the verification server to verify the second signature according to a second public key corresponding to the second private key; and decrypting the encrypted feature information after the second signature is verified successfully, to obtain the biometric feature information, and performing identity verification according to the decrypted biometric feature information, to obtain the identity verification result.

9. The method according to claim 1, further comprising:

receiving, through the application, a resource transfer credential from the verification server that is generated according to the identity verification result; and triggering a resource transfer operation according to the resource transfer credential.

10. A computer device, comprising a memory and a processor, the memory storing a plurality of computer programs that, when executed by the processor, cause the computer device to perform a plurality of operations including:

obtaining a biometric feature image from a video acquisition device via an encrypted connection;

extracting, in a local safe area within a running environment of the computer device, biometric feature information from the biometric feature image, the local safe area being a first type of execution environment;

encrypting, in the local safe area, the biometric feature information, to obtain encrypted feature information, and transmitting the encrypted feature information to an application running in a local normal area within the running environment of the computer device, the local normal area being a second type of execution environment isolated from the first type of execution environment;

transmitting the encrypted feature information to a verification server through the application via a network connection; and receiving, through the application and via the network connection, an identity verification result returned by the verification server, the identity verification result being obtained after the encrypted feature information is decrypted and verified by the verification server.

11. The computer device according to claim 10, wherein the obtaining a biometric feature image from a video acquisition device via an encrypted connection comprises:

receiving, from the video acquisition device, encrypted video data and a first signature corresponding to the video acquisition device, wherein the video acquisition device generates the first signature by further encrypting the encrypted video data using a first private key;

verifying the first signature by using a first public key corresponding to the first private key;

decrypting the encrypted video data in the local safe area after the first signature is verified successfully, to obtain video data; and determining the biometric feature image according to the video data obtained through decryption in the local safe area.

12. The computer device according to claim 11, wherein the plurality of operations further comprise:

presenting an operating interface through the application;

generating a video acquisition instruction in response to detecting a trigger operation on the operating interface; and transmitting the video acquisition instruction to the video acquisition device, the video acquisition instruction being used for instructing the video acquisition device to acquire video data comprising biometric features.

13. The computer device according to claim 10, wherein the extracting biometric feature information from the biometric feature image in a local safe area within a running environment of the computer device comprises:

performing living body detection on the biometric feature image in the local safe area, to obtain a detection result; and extracting the biometric feature information from the biometric feature image in response to the detection result indicating that a living body is detected in the biometric feature image.

14. The computer device according to claim 10, wherein the biometric feature image comprises a face image, the biometric feature information comprises face position information, a target face depth map, and a target face color map, and the extracting biometric feature information from the biometric feature image in a local safe area within a running environment of the computer device comprises:

identifying face feature points in the face image in the local safe area, to obtain the face position information;

determining candidate face depth maps and candidate face color maps comprised in the face image;

performing denoising processing on the candidate face depth maps, to obtain the target face depth map; and screening, from the candidate face color maps, the target face color map that meets a preset condition.

15. The computer device according to claim 10, wherein the encrypting the biometric feature information in the local safe area, to obtain encrypted feature information, and transmitting the encrypted feature information to an application run in a local normal area within the running environment of the computer device further comprises:

encrypting the biometric feature information in the local safe area, to obtain encrypted feature information;

further encrypting the encrypted feature information by using a second private key, to obtain a second signature; and transmitting the encrypted feature information and the second signature to the application run in the local normal area; and the transmitting the encrypted feature information to a verification server through the application via a network connection comprises:

transmitting the encrypted feature information and the second signature to the verification server through the application via the network connection, the encrypted feature information and the second signature being used for instructing the verification server to verify the second signature according to a second public key corresponding to the second private key; and decrypting the encrypted feature information after the second signature is verified successfully, to obtain the biometric feature information, and performing identity verification according to the decrypted biometric feature information, to obtain the identity verification result.

16. The computer device according to claim 10, wherein the plurality of operations further comprise:

receiving, through the application, a resource transfer credential from the verification server that is generated according to the identity verification result; and triggering a resource transfer operation according to the resource transfer credential.

17. A non-transitory computer-readable storage medium, storing a plurality of computer programs that, when executed by a processor of a computer device, cause the computer device to perform a plurality of operations including:

obtaining a biometric feature image from a video acquisition device via an encrypted connection;

extracting, in a local safe area within a running environment of the computer device, biometric feature information from the biometric feature, the local safe area being a first type of execution environment;

encrypting, in the local safe area, the biometric feature information, to obtain encrypted feature information, and transmitting the encrypted feature information to an application running in a local normal area within the running environment of the computer device, the local normal area being a second type of execution environment isolated from the first type of execution environment;

transmitting the encrypted feature information to a verification server through the application via a network connection; and receiving, through the application and via the network connection, an identity verification result returned by the verification server, the identity verification result being obtained after the encrypted feature information is decrypted and verified by the verification server.

18. The non-transitory computer-readable storage medium according to claim 17, wherein the obtaining a biometric feature image from a video acquisition device via an encrypted connection comprises:

receiving, from the video acquisition device, encrypted video data and a first signature corresponding to the video acquisition device, wherein the video acquisition device generates the first signature by further encrypting the encrypted video data using a first private key;

verifying the first signature by using a first public key corresponding to the first private key;

decrypting the encrypted video data in the local safe area after the first signature is verified successfully, to obtain video data; and determining the biometric feature image according to the video data obtained through decryption in the local safe area.

19. The non-transitory computer-readable storage medium according to claim 17, wherein the extracting biometric feature information from the biometric feature image in a local safe area within a running environment of the computer device comprises:

performing living body detection on the biometric feature image in the local safe area, to obtain a detection result; and extracting the biometric feature information from the biometric feature image in response to the detection result indicating that a living body is detected in the biometric feature image.

20. The non-transitory computer-readable storage medium according to claim 17, wherein the encrypting the biometric feature information in the local safe area, to obtain encrypted feature information, and transmitting the encrypted feature information to an application run in a local normal area within the running environment of the computer device further comprises:

encrypting the biometric feature information in the local safe area, to obtain encrypted feature information;

further encrypting the encrypted feature information by using a second private key, to obtain a second signature; and transmitting the encrypted feature information and the second signature to the application run in the local normal area; and the transmitting the encrypted feature information to a verification server through the application via a network connection comprises:

transmitting the encrypted feature information and the second signature to the verification server through the application via the network connection, the encrypted feature information and the second signature being used for instructing the verification server to verify the second signature according to a second public key corresponding to the second private key; and decrypting the encrypted feature information after the second signature is verified successfully, to obtain the biometric feature information, and performing identity verification according to the decrypted biometric feature information, to obtain the identity verification result.

* * * * *